US011604278B2

(12) United States Patent
Izumi (10) Patent No.: US 11,604,278 B2
(45) Date of Patent: Mar. 14, 2023

(54) THREE-DIMENSIONAL DISTANCE MEASUREMENT DEVICE

(71) Applicant: Hitachi-LG Data Storage, Inc., Tokyo (JP)

(72) Inventor: Katsuhiko Izumi, Tokyo (JP)

(73) Assignee: HITACHI-LG DATA STORAGE, INC., Tokyo (JP)

(*) Notice: Subject to any disclaimer, the term of this patent is extended or adjusted under 35 U.S.C. 154(b) by 402 days.

(21) Appl. No.: 16/858,788

(22) Filed: Apr. 27, 2020

(65) Prior Publication Data

US 2021/0003705 A1 Jan. 7, 2021

(30) Foreign Application Priority Data

Jul. 5, 2019 (JP) .............................. JP2019-126149

(51) Int. Cl.
*G01S 17/10* (2020.01)
*G01S 17/89* (2020.01)

(52) U.S. Cl.
CPC .............. *G01S 17/10* (2013.01); *G01S 17/89* (2013.01)

(58) Field of Classification Search
CPC .......... G01S 17/10; G01S 17/89; G01S 7/484; G01S 17/894; G01S 17/18; G01S 7/4866
See application file for complete search history.

(56) References Cited

U.S. PATENT DOCUMENTS

| 10,996,320 B2 * | 5/2021 | Aoki ........................ G01S 17/32 |
| 2001/0046317 A1 * | 11/2001 | Kamon .................... G06T 7/521 |
| | | 382/154 |
| 2018/0149750 A1 | 5/2018 | Kishimoto et al. |
| 2022/0137224 A1 * | 5/2022 | Ono ...................... G01S 17/894 |
| | | 356/4.01 |

FOREIGN PATENT DOCUMENTS

| WO | WO 2016075885 A1 * | 5/2016 | ............. G01S 17/89 |
| WO | 2017/022152 A1 | 2/2017 | |

* cited by examiner

*Primary Examiner* — Ryan R Yang
(74) *Attorney, Agent, or Firm* — Mattingly & Malur, PC (57) ABSTRACT

A three-dimensional distance measurement device includes a light emitting unit that irradiates a subject with light; a light receiving unit that detects reflected light from the subject; a distance calculation unit that calculates a three-dimensional distance to the subject on the basis of a transmission time of the detected reflected light; an image processing unit that generates a distance image of the subject on the basis of the calculated distance data; and a distance mode selection processing unit that selects a predetermined distance mode from a plurality of distance modes having different measurable distance ranges and sets a driving condition of the light emitting unit. By selecting a first distance mode in a first frame and selecting a second distance mode in a second frame, and by combining the distance data acquired in the respective frames, three-dimensional distance data of a frame to be output is generated.

4 Claims, 8 Drawing Sheets

FRAME 1
(SHORT DISTANCE MODE)

FRAME 2
(LONG DISTANCE MODE)

OUTPUT FRAME

THREE-DIMENSIONAL DISTANCE MEASUREMENT DEVICE

CLAIM OF PRIORITY

The present application claims priority from Japanese patent application serial No. JP 2019-126149, filed on Jul. 5, 2019, the content of which is hereby incorporated by reference into this application.

BACKGROUND OF THE INVENTION

(1) Field of the Invention

The present invention relates to a three-dimensional distance measurement device that outputs a position of a subject such as a person as a distance image.

(2) Description of the Related Art

There is known a technique of measuring a distance to an object on the basis of a transmission time (hereinafter, time of flight (TOF) method) of light and outputting an image (distance image) displaying the distance. In order to accurately measure the distance to an object, it is necessary to measure the coordinates of each object in a three-dimensional space with high accuracy. In the TOF method, the distance measurement accuracy (distance measurement resolution) and the distance range depend on the frequency of the irradiated light (the length of the light emission period), and as the frequency of the irradiated light increases, the distance measurement at high accuracy can be performed. However, the measurable distance range becomes narrow.

For example, the distance measurement imaging device described in WO 2017/022152 A1 has aimed at achieving both high distance measurement accuracy and long distance measurement range and has proposed a method of combining first distance measurement according to a continuous exposure period (continuous wave) method and second distance measurement according to a pulse method.

SUMMARY OF THE INVENTION

In the distance measurement according to the TOF method, since the light which each object is irradiated with and which is reflected on each object and returned to the distance measurement device is weak, in some cases, the measurement accuracy is influenced by the irradiation environment of the light which the object is irradiated with. In addition, when the measurement distance is to be increased, the light returning to the distance measurement device is further weakened, and thus, there is a problem that the distance measurement accuracy is reduced. The technique of WO 2017/022152 A1 mentioned above aims at achieving both high distance measurement accuracy and long distance measurement range. However, the problem of inter-device interference occurring at the time of installing a plurality of distance measurement imaging devices in the same area is not considered.

The inter-device interference is a phenomenon in which an error occurs in a measured distance value when irradiation light (or reflected light) on devices other than the own device becomes interference light and is exposed by the own device. As a countermeasure, there is known a method of changing a modulation frequency of a light emission pulse for each device to reduce a distance measurement error caused by the interference. However, in order to apply this method to the configuration of WO 2017/022152 A1, the pulse width needs to be changed in common between the continuous method and the pulse method. Therefore, this method is practically difficult.

An object of the present invention is to provide a three-dimensional distance measurement device capable of performing high-accuracy distance measurement even in a wide measurement distance range without influencing on the countermeasure for the interference at the time of installing a plurality of devices.

According to the present invention, there is provided a three-dimensional distance measurement device that outputs a position of a subject as a distance image, including: a light emitting unit that irradiates the subject with light; a light receiving unit that detects reflected light from the subject; a distance calculation unit that calculates a three-dimensional distance to the subject on the basis of a transmission time of the reflected light detected by the light receiving unit; an image processing unit that generates a two-dimensional distance image of the subject on the basis of a distance data calculated by the distance calculation unit; and a distance mode selection processing unit that selects a predetermined distance mode from a plurality of distance modes having different measurable distance ranges and sets a driving condition of the light emitting unit. The distance mode selection processing unit acquires three-dimensional distance data from a first distance mode in a first frame and acquires three-dimensional distance data from a second distance mode in a second frame, and the image processing unit generates three-dimensional distance data of a frame to be output by combining the three-dimensional distance data acquired in the first frame and the three-dimensional distance data acquired in the second frame.

According to the present invention, it is possible to provide a three-dimensional distance measurement device capable of performing high-accuracy distance measurement in a wide measurement distance range. At this time, since a countermeasure for the inter-device interference of the related art can be applied, the problem at the time of installing a plurality of devices does not occur.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF THE EMBODIMENT

Hereinafter, embodiments of a three-dimensional distance measurement device according to the present invention will be described with reference to the drawings.

First Embodiment

Figure 1:
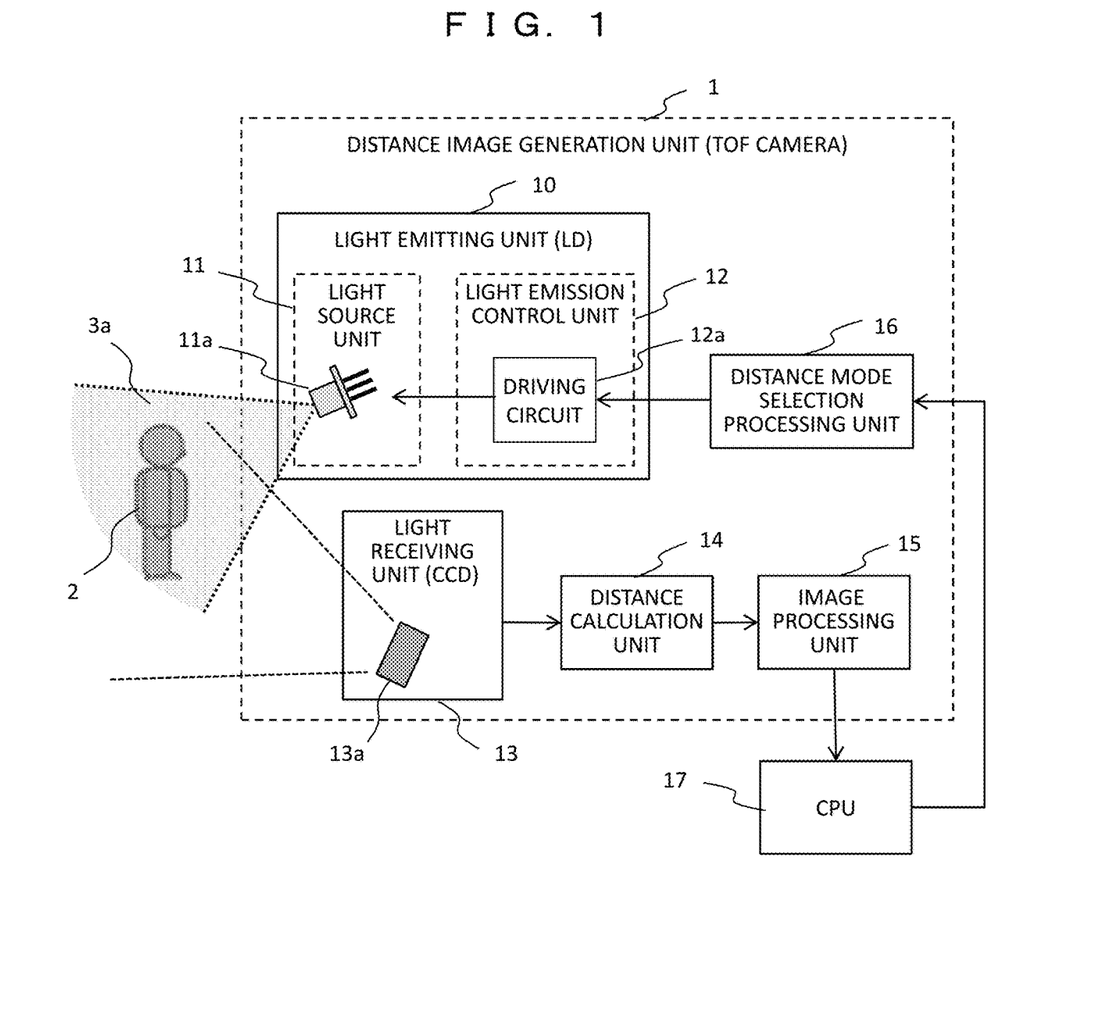
FIG. 1 is a configuration view of a three-dimensional distance measurement device according to a first embodiment.

FIG. 1 is a configuration view of a three-dimensional distance measurement device according to a first embodiment. In the following example, a case where the position of a person as an object is detected will be described. The three-dimensional distance measurement device measures a distance to a subject including a person by using a Time of Flight (TOF) method, displays the measured distance to each portion of the subject in, for example, color, and outputs the distance as a distance image.

The three-dimensional distance measurement device has a configuration in which a distance image generation unit 1 (hereinafter, also referred to as a TOF camera or simply TOF) that generates the distance image according to the TOF method is controlled by a CPU 17. Herein, a principle of distance measurement by the TOF will be described later.

The TOF camera 1 includes: a light emitting unit 10 that includes a laser diode (LD) or a light emitting diode (LED) that irradiates a subject 2 with pulse light; a light receiving unit 13 that includes a CCD sensor or a CMOS sensor that receives pulse light reflected from the subject; a distance calculation unit 14 that calculates a distance to the subject from a detection signal of the light receiving unit 13; an image processing unit 15 that outputs the distance as a distance image of the subject 2 with reference to the distance data output from the distance calculation unit 14; and a distance mode selection processing unit 16 that sets a driving condition of the light emission pulse so as to select a distance mode having a different measurable distance range. The TOF camera 1 can perform a three-dimensional distance measurement under the control of the CPU 17. Next, the configuration and function of each unit will be described in detail.

In the TOF camera 1 illustrated in FIG. 1, the light emitting unit 10 includes a light source unit 11 that is configured with a laser light source and a light emission control unit 12 that performs light emission or turning-off of the laser light source or adjustment of the light emission amount. The light source unit 11 is provided with a laser light source 11a, and an irradiation area indicated by 3a is irradiated with the laser light emitted from each laser light source.

The light emission control unit 12 includes a laser driving circuit 12a that drives the laser light source, and the laser driving circuit 12a corresponds to the laser light source 11a. It is configured that, according to a command from the CPU 17 of the outside, the driving condition of the light emission pulse is set according to the distance mode selected by the distance mode selection processing unit 16, and after that, the light emission or turning-off of the laser light source 11a of the light source unit 11 is controlled.

The light reflected from the subject 2 is detected by a CCD sensor 13a mounted on the light receiving unit 13, and the photo-electrically converted signal is transmitted to the distance calculation unit 14. The distance calculation unit 14 calculates the distance to the subject 2 and transmits distance data to the subject 2 to the image processing unit 15.

The image processing unit 15 stores the distance data transmitted from the distance calculation unit 14 in the internal memory and combines the distance data between frames. Then, a colorization process for changing the hue of the person or object image on the basis of the distance data is performed to be output to an external device or to be displayed on a display or the like. The image processing may be processing for changing brightness, contrast, and the like. The user can easily know the position (distance) and shape (posture) of an object such as a person by seeing the colorized image.

Next, the operation of each unit will be described.

Figure 2A:
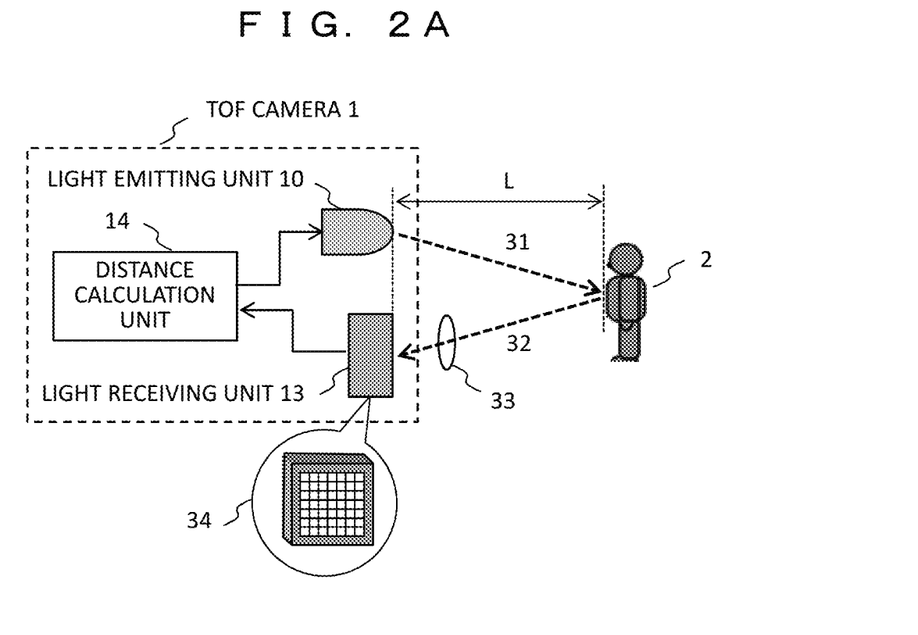
FIG. 2A is a view describing a principle of distance measurement according to a TOF method.
Figure 2B:
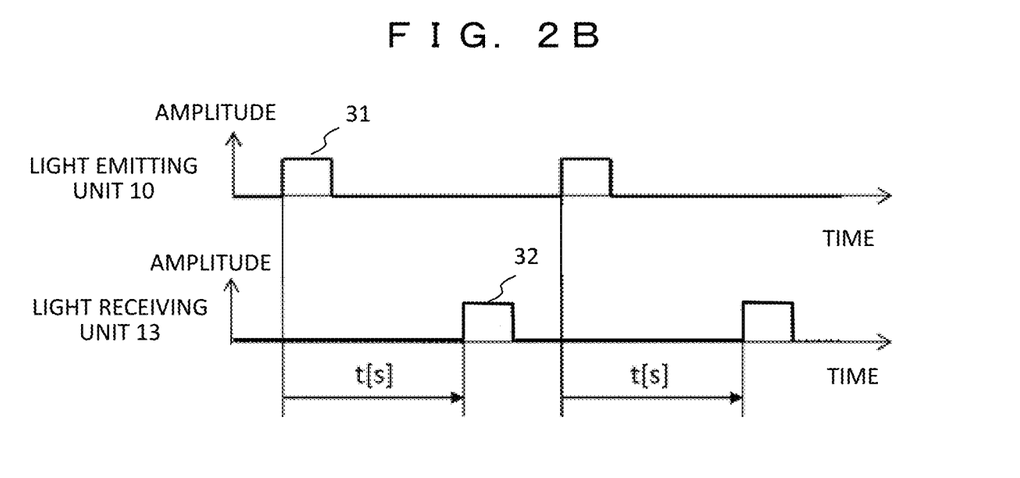
FIG. 2B is a view describing the principle of distance measurement according to the TOF method.

FIGS. 2A and 2B are views describing the principle of distance measurement according to the TOF method. In the TOF method, the distance is calculated on the basis of a time difference between an emitted light signal and a received light signal.

FIG. 2A is a view illustrating a relationship between the TOF camera (distance image generation unit) 1 and the subject 2 (for example, a person). The TOF camera 1 has the light emitting unit 10 and the light receiving unit 13, and emits a light emission pulse 31 for distance measurement from the light emitting unit 10 to the subject 2. As the emitted light, infrared light is used. The light receiving unit 13 receives a reflected light 32 (light receiving pulse) of the light emitted to the subject 2 and receives the reflected light with a two-dimensional sensor 34 such as a CCD through an objective lens 33. The subject 2 exists at a position apart by L [m] from the light emitting unit 10 and the light receiving unit 13. Herein, when the speed of light is denoted by c [m/s] and the time difference between the time when the light emitting unit 10 starts emitting light and the time when the light receiving unit 13 receives the reflected light is denoted by t [s], the distance L [m] to the subject 2 is obtained as follows.

$$L \text{ [m]} = c \text{ [m/s]} \times t \text{ [s]}/2 \qquad (1)$$

FIG. 2B is a view illustrating measurement of the time difference t. The distance calculation unit 14 measures the time difference t from the timing of the light emission pulse 31 emitted from the light emitting unit 10 and the timing of receiving the light receiving pulse 32 by the light receiving unit 13 and calculates the distance L to the subject 2 from Formula (1). In addition, the difference in the distance between the respective positions of the subject, that is, an uneven shape of the subject can be obtained from the shift of the light receiving timing at each pixel position in the two-dimensional sensor 34.

Figure 3A:
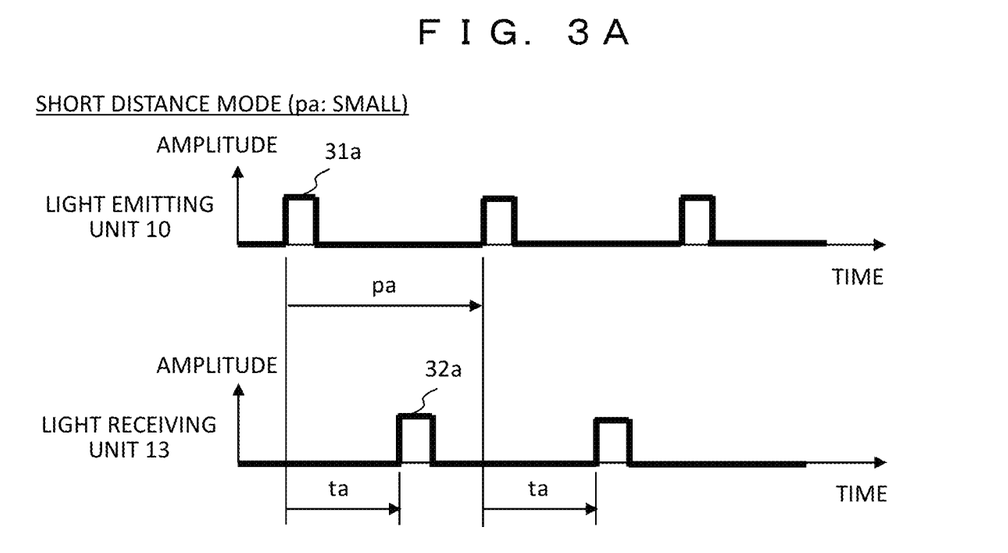
FIG. 3A is a view describing a distance mode (short distance) according to the first embodiment.
Figure 3B:
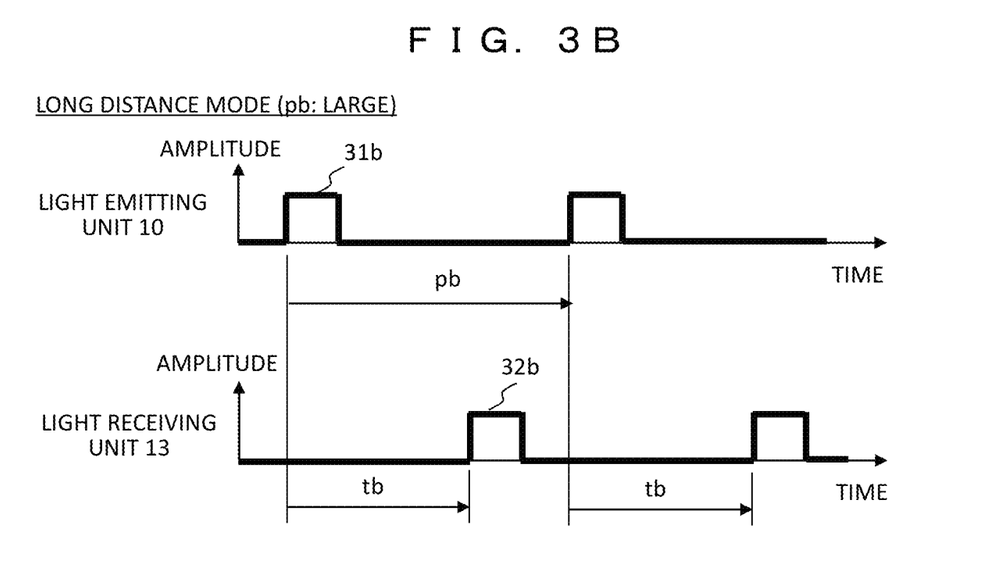
FIG. 3B is a view describing a distance mode (long distance) according to the first embodiment.

FIGS. 3A and 3B are views describing distance modes of the TOF camera according to the first embodiment. FIG. 3A is a distance mode for measuring a short distance, and FIG. 3B is a distance mode for measuring a long distance. In FIGS. 3A and 3B, driving interval times pa and pb of the respective light emission pulses 31 are different (pa<pb). When the driving interval time p of the light emission pulse 31 becomes short, the maximum value of the time difference t also becomes short, so that the measurable distance (limit distance) D also becomes short. For this reason, with respect to the resolution in the TOF distance measurement, if the number of allocated bits is the same, as the measurable distance D is shorter, finer distance resolution (that is, higher distance accuracy) can be achieved. At this time, the short distance side (minimum distance) of the measurable distance is the same regardless of the distance mode, and the long distance side (limit distance) of the measurable distance differs depending on the setting of the distance mode. In the present embodiment, the distance mode is configured to be set by the CPU 17 in order to optimize the measurable distance (limit distance) D including the distance to the subject 2.

Figure 4A:
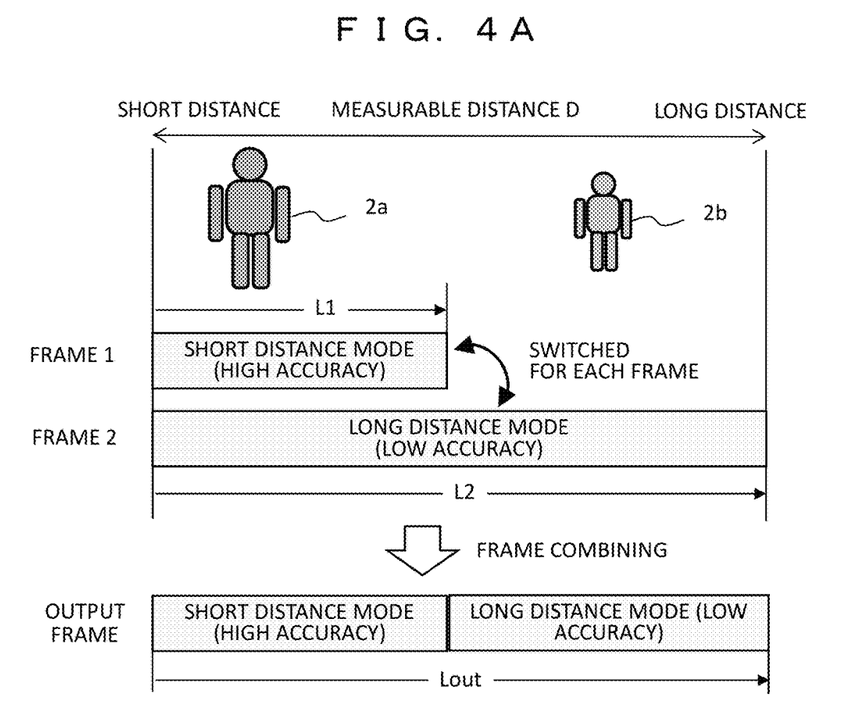
FIG. 4A is a view describing a distance mode and frame combining.
Figure 4B:
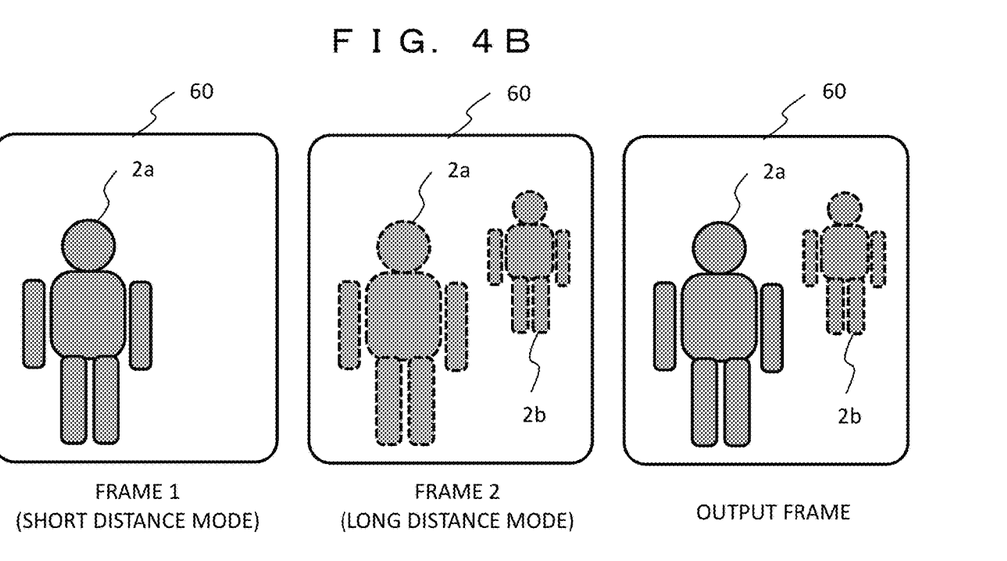
FIG. 4B is a view schematically illustrating methods of exhibiting subjects.

FIGS. 4A and 4B are views describing the distance mode and frame combining. FIG. 4A describes a configuration in which an output frame is formed by combining frames having different distance modes, and FIG. 4B is a view schematically illustrating methods of exhibiting the subjects at that time as distance images 60. FIG. 4A illustrates a case where there are a person 2a on the short distance side and a person 2b on the long distance side as the subjects. In the frame 1, the distance mode is set to the short distance side (the mode in FIG. 3A), and the measurable distance is denoted by L1. On the other hand, in the frame 2, the distance mode is set to the long distance side (the mode in FIG. 3B), and the measurable distance is denoted by L2. The measurable distances of the two sides have a relationship of L1<L2.

In the present embodiment, two different distance modes are switched for each frame, and an optimum distance mode is selected for each pixel or each frame to perform frame combining. That is, by performing frame combining described later, as illustrated in FIG. 4B, for the subject 2a on the short distance side, the distance measurement is performed in the high-accuracy short distance mode; and for the subject 2b on the long distance side, the distance measurement is performed in the long distance mode where the accuracy is low but the measurable distance is large. As a result, as compared with the method of the related art, it is possible to suppress the decrease in measurement accuracy to a minimum level while securing the measurable distance Lout to a long distance similarly to L2.

In addition, the measurement method according to the present embodiment, in a case where a plurality of three-dimensional distance measurement devices are installed and operated in the same area, a method of changing the modulation frequency of the light emission pulse for each device can be applied in order to avoid the inter-device interference. Accordingly, the problem as described in WO 2017/022152 A1 described above does not occur.

Figure 5:
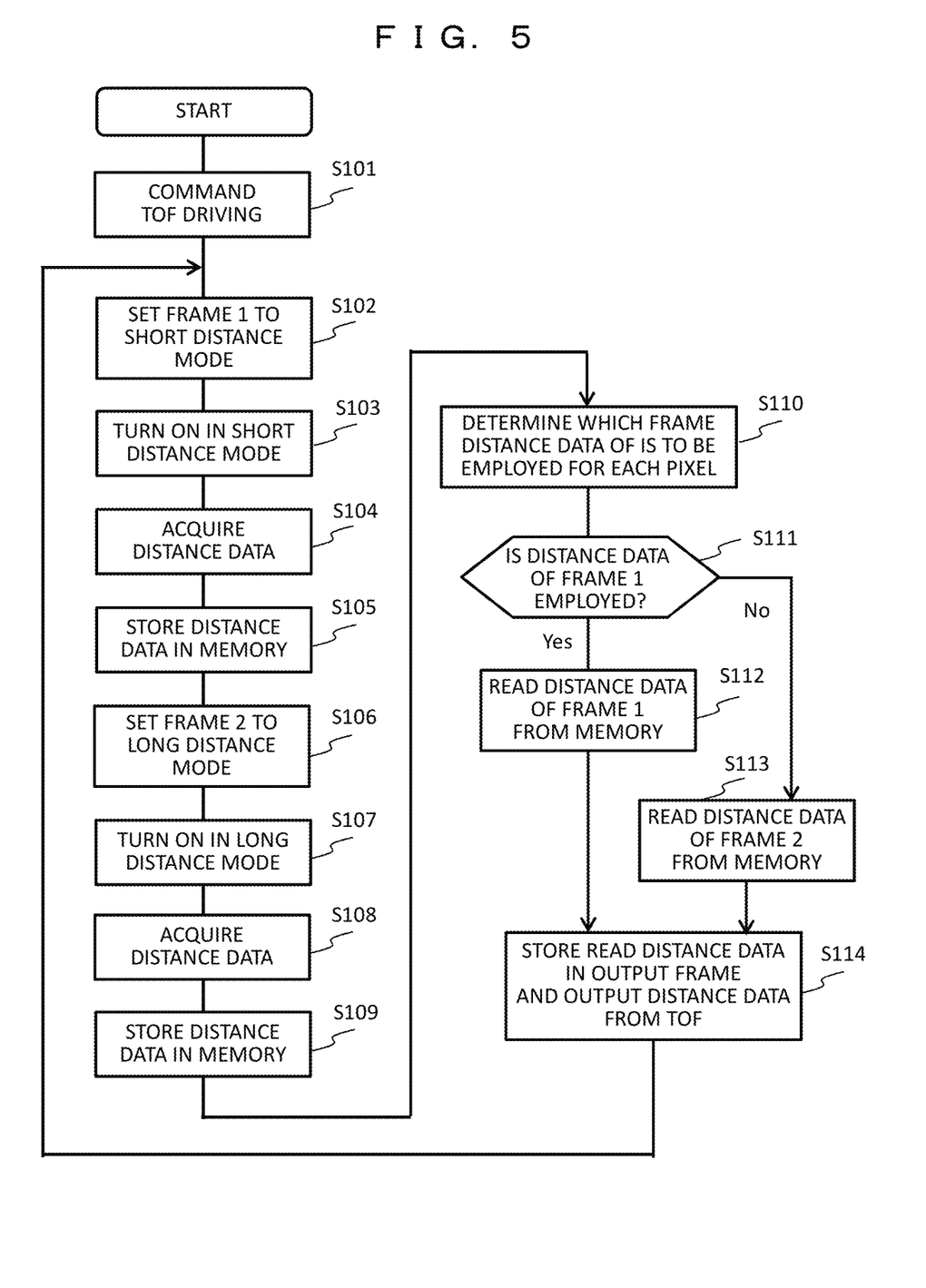
FIG. 5 is a flowchart illustrating a flow of a frame combining process.

FIG. 5 is a flowchart illustrating a flow of a frame combining process. The following frame combining process is executed by the CPU 17 of the three-dimensional distance measurement device controlling the operation of each unit in FIG. 1. Hereinafter, the description will be made in the order of steps.

S101: TOF driving is commanded by the CPU 17 to activate the TOF.

S102: The distance mode selection processing unit 16 sets the distance mode of the frame 1 to the short distance mode.

S103: The light emission control unit 12 performs turning-on of the light source unit 11 in the short distance mode.

S104: The light receiving unit 13 receives the reflected light from the subject, and the distance calculation unit 14 acquires the distance data.

S105: The distance data of the frame 1 is stored in the internal memory, and the process in the frame 1 is ended.

S106: The distance mode selection processing unit 16 sets the distance mode of the frame 2 to the long distance mode.

S107: The light emission control unit 12 performs turning-on of the light source unit 11 in the long distance mode.

S108: The light receiving unit 13 receives the reflected light from the subject, and the distance calculation unit 14 acquires the distance data.

S109: The distance data of the frame 2 is stored in the internal memory, and the process in the frame 2 is ended.

At this point, the three-dimensional distance data within a short distance measurement range is acquired in the frame 1, and the three-dimensional distance data within a long distance measurement range is acquired in the frame 2.

S110: The image processing unit 15 determines which frame the distance data of is to be employed for each pixel. The determination method is as follows. For the pixels for which the distance measurement has been performed in the frame 1, the distance data of the frame 1 is employed. On the other hand, since the pixels for which the distance measurement has not been performed in the frame 1 are outside the short distance measurement range, the long distance data of the frame 2 is employed.

S111: According to the determination in S110, the process branches depending on whether or not the distance data of the frame 1 is employed. If the distance data of the frame 1 is employed, the process proceeds to S112. If the distance data of the frame 1 is not employed, the process proceeds to S113.

S112: The image processing unit 15 reads the distance data of the frame 1 from the internal memory.

S113: The image processing unit 15 reads the distance data of the frame 2 from the internal memory.

S114: The image processing unit 15 stores the read distance data in the output frame. When the process is completed for all the pixels, the distance data for the output frame is output from the TOF camera.

After that, the process returns to S102 to repeats the above-described processing.

As described above, according to the first embodiment, the output frame is generated by combining the short-distance three-dimensional distance data acquired in the frame 1 and the long-distance three-dimensional distance data acquired in the frame 2, and the three-dimensional distance data for the output frame after combining the data is output from the TOF camera. As a result, by securing the measurement distance range to a long distance and maintaining high accuracy on the short distance side, it is possible to suppress a decrease in measurement accuracy to a minimum level.

Second Embodiment

Next, a three-dimensional distance measurement device according to a second embodiment will be described. The basic configuration of the device is the same as that of the first embodiment illustrated in FIG. 1, and thus the description will be omitted herein. In a TOF method according to the second embodiment, a distance measurement method different from that of the first embodiment is employed.

Figure 6:
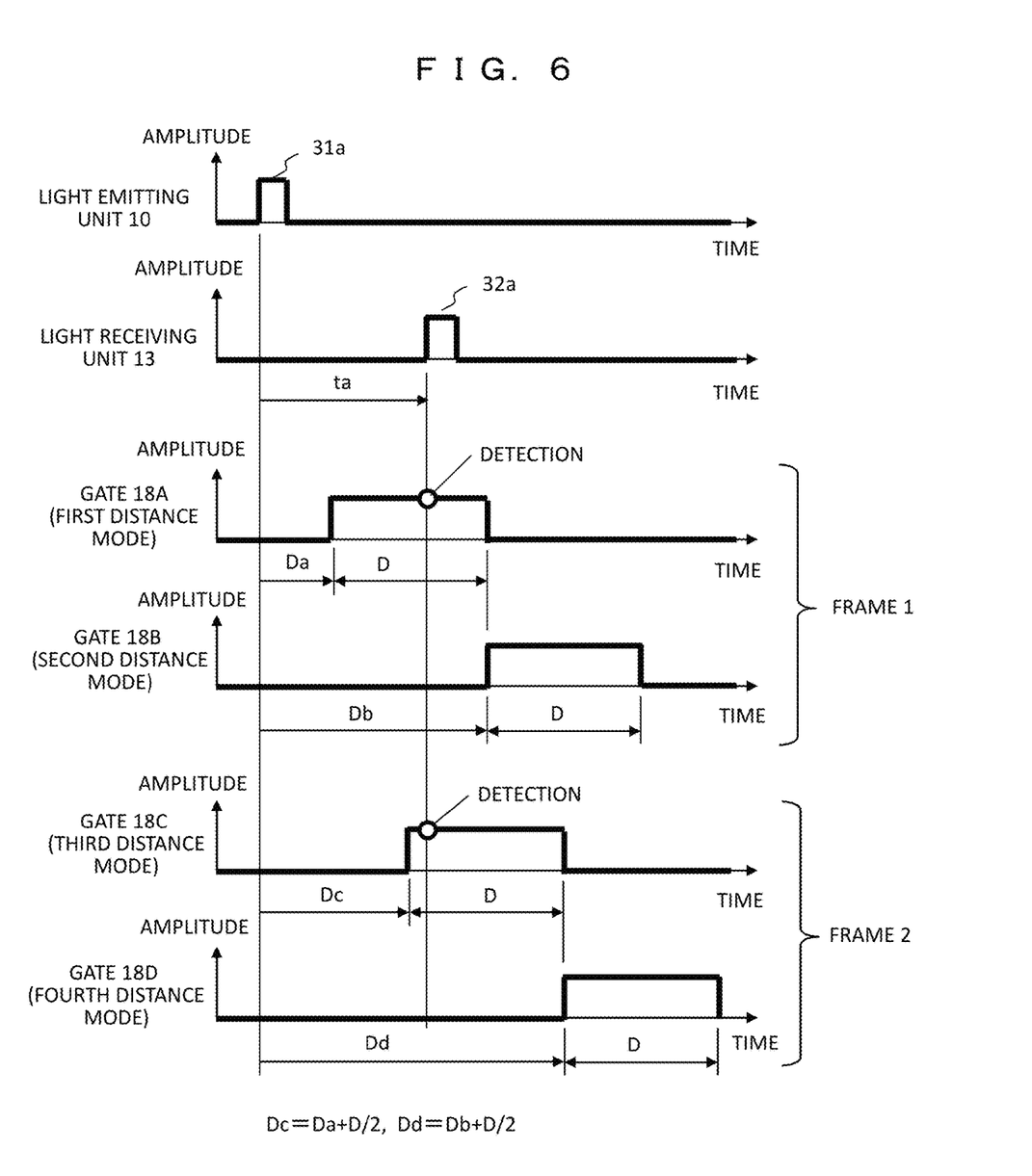
FIG. 6 is a view describing a distance measurement method according to a second embodiment.

FIG. 6 is a view describing the distance measurement method of the TOF camera according to the second embodiment. A light emission pulse 31a emitted from a light emitting unit 10 reflects a subject and, after that, reaches a light receiving unit 13 to become a light receiving pulse 32a. At this time, a gate 18 is set at a plurality of different delay time positions with reference to the light emission timing of the light emission pulse 31a. Then, it is determined which set gate 18 the light receiving pulse 32a is detected during the open period of. As a result of the determination, the subject exists at the position of the measured distance corresponding to the time position of the detected gate. That is, the position of the gate in the second embodiment corresponds to the distance mode in the first embodiment.

In the example of FIG. 6, gates 18A and 18B for the frame 1 (first and second distance modes) and gates 18C and 18D for the frame 2 (third and fourth distance modes) are illustrated. The open period of each gate is denoted by D, and the starting positions of the gates with reference to the light emission pulse 31*a* are denoted by Da to Dd. The gates 18A and 18B existing in the same frame are adjacent, and the gates 18C and 18D are adjacent. In other words, in this relationship, the limit distances on the long distance sides of the measurable distance ranges (the gates 18A and 18C) in the first and third distance modes and the limit distances on the short distance sides of the measurable distance ranges (the gates 18B and 18D) in the second and fourth distance modes substantially coincide with each other.

In addition, the gates 18A and 18C are shifted by a half cycle of the open period, and the gates 18B and 18D are shifted by a half cycle of the open period. In other words, the third distance mode is shifted by a phase of a half cycle with respect to the first distance mode, and the fourth distance mode is shifted by a phase of a half cycle with respect to the second distance mode. In addition, the phase shift amount may not be a half cycle, and if the gate 18C (third distance mode) is configured to include a portion of the gate 18A (first distance mode) and a portion of the gate 18B (second distance mode), the effect of the present embodiment can be obtained. In each frame, adjacent gates (not illustrated) are similarly repeated after the gates 18B and after the gate 18D.

In the example of FIG. 6, the light receiving pulse 32*a* is detected at the gates 18A and 18C (indicated by a mark ○). In a case where the light receiving pulse 32*a* cannot be detected at the gates 18A and 18C, it is checked whether or not the light receiving pulse 32*a* can be detected at the adjacent gates 18B and 18D, and in a case where the light receiving pulse 32*a* cannot be further detected, the same operation is repeated at the adjacent gates (not illustrated). The distance data obtained by a series of the operations is set to distance data in the frames 1 and 2. In addition, the distance data obtained in this case is regarded as the distance data at the center position of, for example, the gate period D, regardless of at which timing in the gate the distance data is detected within the same gate. Since such a measurement method can measure a distance only by the presence or absence of reflected light within the gate period D, the measurement method is advantageous for the long-distance measurement by combining weak reflected light and a highly sensitive photodetector, which is a merit.

In FIG. 6, the method of detecting the distance to the subject as the frame 1 by using a set of the gates 18A and 18B is the same as the above-described description of the TOF method. On the contrary, in the second embodiment, it is characterized in that another set of gates 18C and 18D in which the gate opening timing is shifted by a half cycle is set, and the method of detecting the distance to the subject as the frame 2 by using the gates is combined. With such a configuration, the frames 1 and 2 are alternately repeated, and the gate information for which the reflected light has been detected is confirmed in each of the frames 1 and 2, so that the distance measurement accuracy can be improved as described below.

Figure 7A:
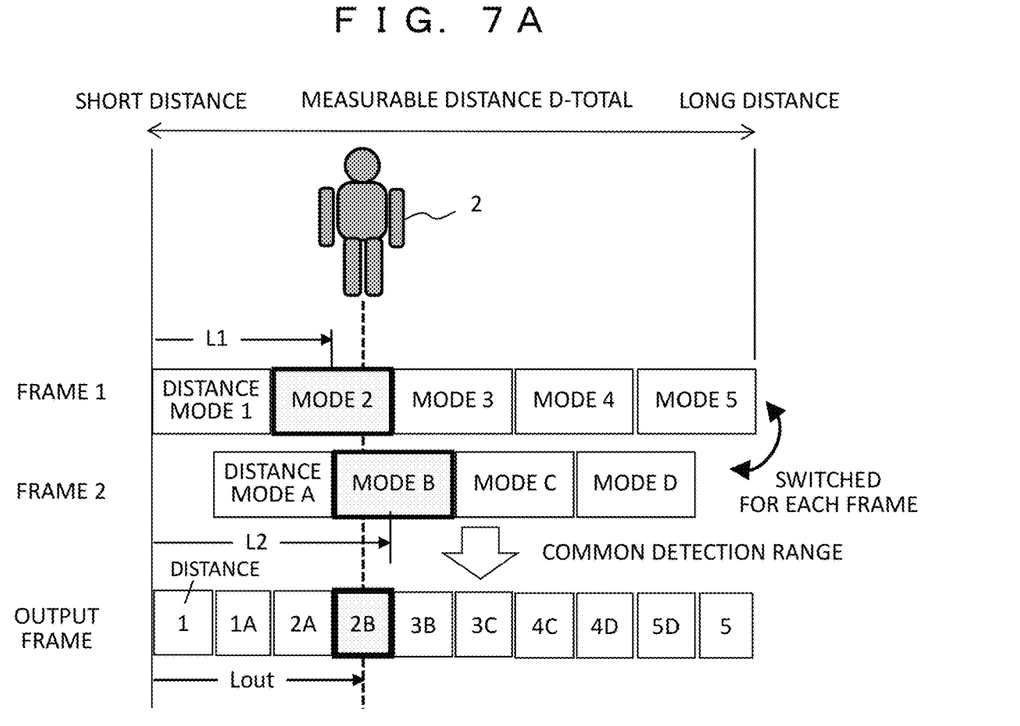
FIG. 7A is a view describing a distance mode and frame combining.
Figure 7B:
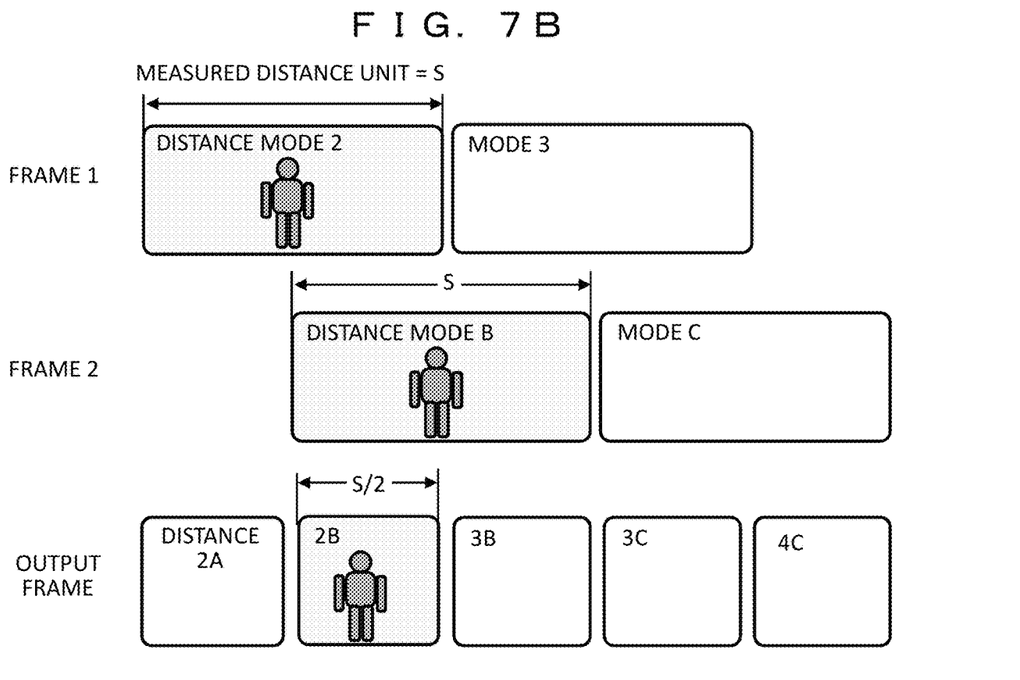
FIG. 7B is a view schematically illustrating a detection state of a subject.

FIGS. 7A and 7B are views describing the distance modes and frame combining. FIG. 7A describes a configuration in which the frames 1 and 2 of which gate timings are shifted by a half cycle are combined to form an output frame. FIG. 7B is a view schematically illustrating a detection state of the subject 2 at that time. The frame 1 corresponds to the gates 18A and 18B in FIG. 6, and is described as distance modes 1, 2, . . . from the short distance side. The frame 2 corresponds to gates 18C and 18D in FIG. 6, and is described as distance modes A, B, . . . from the short distance side. In addition, the output frame is divided by an overlapping area of the distance modes of the frames 1 and 2 and described as distances 1A, 2A, 2B, . . . .

In FIG. 7A, in the frame 1, the subject 2 is detected as the distance L1 at the timing of the distance mode 2. On the other hand, in the frame 2, the subject 2 is detected as the distance L2 at the timing of the distance mode B. In the second embodiment, a common range of the detection range of the frame 1 and the detection range of the frame 2 is regarded as an existence range of the subject. Therefore, in the output frame, it is detected as a distance Lout corresponding to a common period (indicated by distance 2B) between the distance mode 2 and the distance mode B.

FIG. 7B schematically illustrates the detection state of the subject 2 in each frame. As described above, the subject 2 is detected in the distance mode 2 in the frame 1 and is detected in the distance mode B in the frame 2. As described above, in a single frame, the subject is detected in any one of the distance modes, but the position accuracy is determined in principle by an interval (measured distance unit S) between adjacent distance modes. According to this embodiment, by combining two frames into an output frame, the effective distance width (measured distance unit) of the distance mode can be reduced to half (S/2). Therefore, with respect to the accuracy of the distance measurement of the present embodiment, the resolution (the distance measurement accuracy) can be improved to be twice the accuracy of the distance measurement using only the frame 1 or the frame 2.

Figure 8:
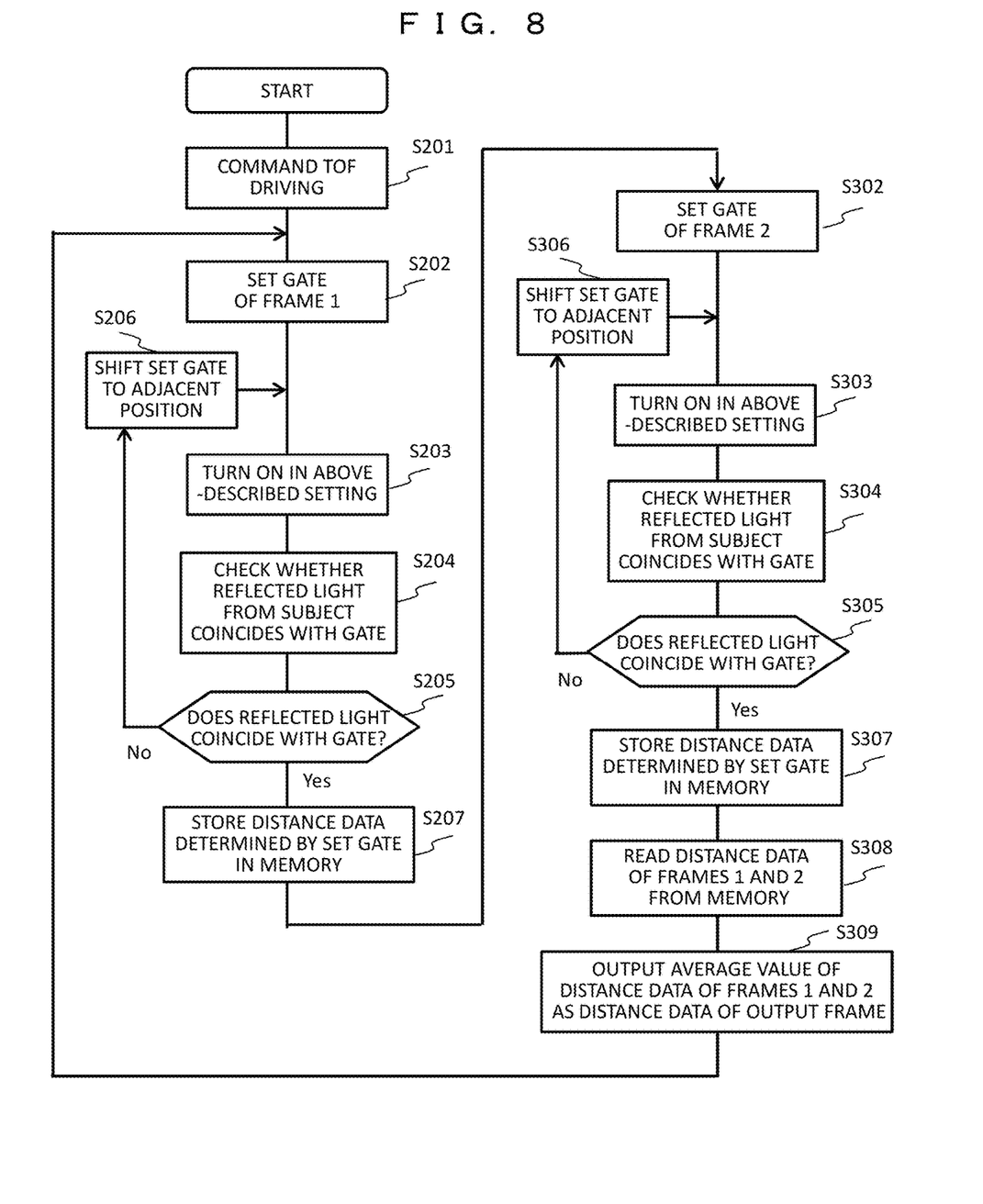
FIG. 8 is a flowchart illustrating a flow of a frame combining process.

In addition, in the present embodiment, an example in which two frames are combined is described. However, a configuration in which the number of frames is increased up to n (n is 3 or more) and gate timings are shifted from each other is also possible. In this case, it goes without saying that the effective distance width (measured distance unit) can be further narrowed to S/n to improve the distance measurement accuracy. FIG. 8 is a flowchart illustrating a flow of a frame combining process. The following frame combining process is executed by the CPU 17 of the three-dimensional distance measurement device controlling the operation of each unit in FIG. 1. Hereinafter, the description will be made in the order of steps.

S201: TOF driving is commanded by the CPU 17 to activate the TOF.

S202: The distance mode selection processing unit 16 sets the gate of the frame 1. For example, the gate 18A (mode 1) which is the shortest distance is set.

S203: The light emission control unit 12 performs turning-on of the light source unit 11.

S204: The light receiving unit 13 receives the reflected light from the subject and checks whether the reflected light coincides with the set gate.

S205: It is determined whether or not the timing of the reflected light coincides with the set gate. If the timing coincides, the process proceeds to S207; and if the timing does not coincide, the process proceeds to S206.

S206: The set gate is shifted to the adjacent position. For example, the process is shifted from the gate 18A (mode 1) to the gate 18B (mode 2) and executed from S203.

S207: The distance calculation unit 14 stores the distance data determined by the set gate in the internal memory, and the process in the frame 1 is ended.

Next, the process of the frame 2 is started.

S302: The distance mode selection processing unit 16 sets the gate of the frame 2. For example, the gate 18C (mode A) which is the shortest distance is set.

S303: The light emission control unit 12 performs turning-on of the light source unit 11.

S304: The light receiving unit 13 receives the reflected light from the subject and checks whether the reflected light coincides with the set gate.

S305: It is determined whether or not the timing of the reflected light coincides with the set gate. If the timing coincides, the process proceeds to S307; and if the timing does not coincide, the process proceeds to S306.

S306: The set gate is shifted to the adjacent position. For example, the process is shifted from the gate 18C (mode A) to the gate 18D (mode B) and executed from S303.

S307: The distance calculation unit 14 stores the distance data determined by the set gate in the internal memory, and the process in the frame 2 is ended.

Next, a process of combining the frames 1 and 2 is performed.

S308: The image processing unit 15 reads the distance data of the frames 1 and 2 from the internal memory.

S309: The image processing unit 15 outputs the average value of the distance data of the frames 1 and 2 as the distance data of the output frame from the TOF camera.

After that, the process returns to S202 and repeats the above-described processing.

As described above, according to the second embodiment, an output frame is generated by combining the three-dimensional distance data acquired in the frame 1 and the three-dimensional distance data acquired in the frame 2, and the three-dimensional distance data for the output frame after combining the data is output from the TOF camera. As a result, the resolution can be increased as compared with a case where detection is performed for a single frame, and even in a case where the measurement distance range is long, distance measurement can be performed with a reduction in measurement accuracy being suppressed.

What is claimed is:

1. A three-dimensional distance measurement device that outputs a position of a subject as a distance image, comprising:

a light emitting unit that irradiates the subject with light;

a light receiving unit that detects reflected light from the subject;

a distance calculation unit that calculates a three-dimensional distance to the subject on the basis of a transmission time of the reflected light detected by the light receiving unit;

an image processing unit that generates a two-dimensional distance image of the subject on the basis of a distance data calculated by the distance calculation unit; and a distance mode selection processing unit that selects a predetermined distance mode from a plurality of distance modes having different measurable distance ranges and sets a driving condition of the light emitting unit, wherein the distance mode selection processing unit acquires at least three-dimensional distance data from first and second distance modes in the first frame and at least three-dimensional distance data from third and fourth distance modes in the second frame, and wherein the image processing unit generates three-dimensional distance data of a frame to be output by combining the three-dimensional distance data acquired in the first frame and the three-dimensional distance data acquired in the second frame.

2. The three-dimensional distance measurement device according to claim 1, wherein the limit distance on the long distance side of the measurable distance range in the first distance mode substantially coincides with a limit distance on a short distance side of the measurable distance range in the second distance mode, wherein the limit distance on the long distance side of the measurable distance range in the third distance mode substantially coincides with a limit distance on a short distance side of the measurable distance range in the fourth distance mode, and wherein the third distance mode includes a portion of the measurable distance range in the first distance mode and includes a portion of the measurable distance range in the second distance mode.

3. The three-dimensional distance measurement device according to claim 2, wherein the third distance mode of the second frame is shifted by a phase of a half cycle with respect to the first distance mode of the first frame.

4. The three-dimensional distance measurement device according to claim 3, wherein the three-dimensional distance data of the output frame is generated by averaging the three-dimensional distance data of the first frame and the three-dimensional distance data of the second frame.

* * * * *